Oct. 1, 1963      M. R. CHAMBERS      3,105,910

MEANS FOR BOOSTING RUN-DOWN VEHICLE BATTERIES

Filed May 16, 1962

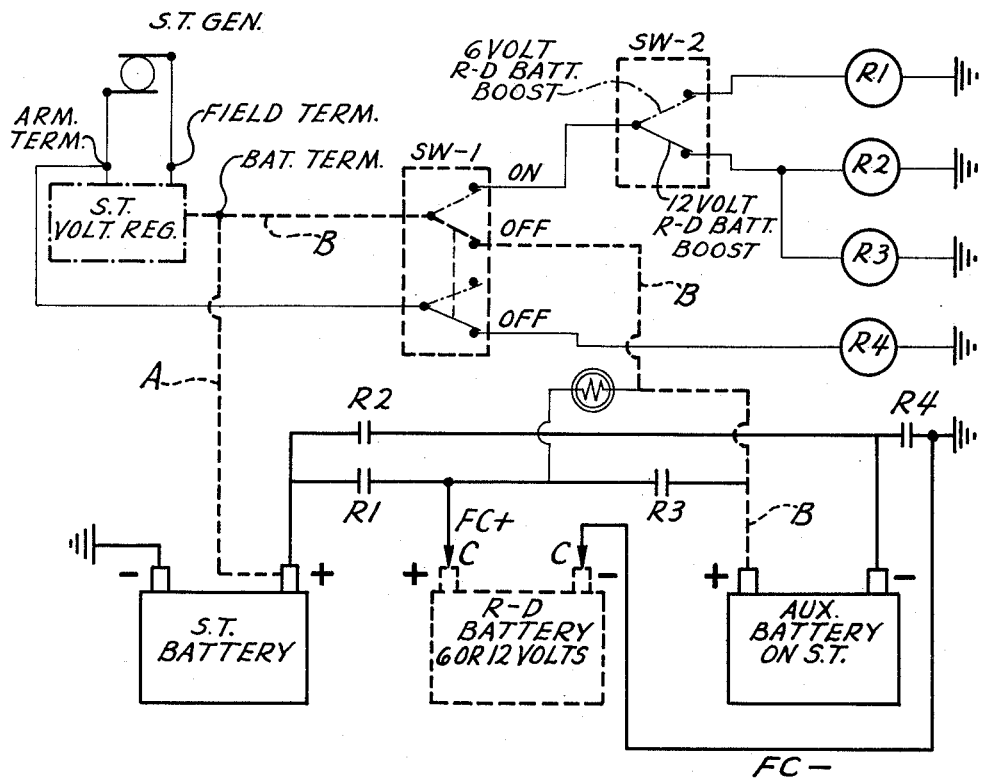

*Key To Symbols*

——— CONTROL CIRCUIT
- - - - CHARGE CIRCUIT
——— POWER CIRCUIT

A = SERVICE TRUCK BATTERY CHARGE CONDUCTOR
B = AUXILIARY BATTERY CHARGE CONDUCTOR
C = ALLEGATOR CONNECTOR
Ⓡ    SOLENOID OF RELAY
—|⊢— RELAY (NORMALLY OPEN)
—Ⓦ— REVERSED POLARITY WARNING LIGHT
S.T. = SERVICE TRUCK
R-D = RUN-DOWN BATTERY
SW = MANUALLY OPERATED SWITCH
FC = FLEXIBLE CABLE LEAD (+ OR −)

INVENTOR.
MARSHALL R. CHAMBERS
BY
*Everett G. Wright*,
ATTORNEY

United States Patent Office 3,105,910
Patented Oct. 1, 1963

3,105,910
MEANS FOR BOOSTING RUN-DOWN
VEHICLE BATTERIES
Marshall R. Chambers, 5070 Deepwood,
Bloomfield Hills, Mich.
Filed May 16, 1962, Ser. No. 195,156
4 Claims. (Cl. 307—49)

This invention relates to means for boosting run-down vehicle batteries including an improved simplified electrical circuit therefor.

The internal combustion engines of automotive vehicles often are difficult or impossible to start because of the fact that the battery of the electrical system thereof becomes run-down, which more often occurs in cold weather due to the current required for the starter motor to turn-over or crank the engine. In such instances, a service truck is called to push or tow the vehicle, or to provide booster current to the run-down or inadequately charged battery of the stalled vehicle.

The primary object of the instant invention is to provide an improved means carried by a service truck readily connectible to a run-down battery of an automotive vehicle including, for example, the normal twelve volt service truck battery and a twelve volt auxiliary battery, the twelve volt service truck battery being connectible in parallel to a six-volt run-down battery to provide a twelve volt booster current for said six volt run-down vehicle battery, and alternatively, the said twelve volt service truck battery and the twelve volt auxiliary battery being connectible is series with each other and in parallel to the twelve volt run-down battery to provide a twenty-four volt booster current for said twelve volt run-down vehicle battery; the said means for boosting run-down vehicle batteries carried by the service truck employing a simplified circuit which incorporates, in addition to the aforesaid booster functions, (a) a polarity indicator means for providing a "warning light" which illuminates when the connecting terminals of the battery booster circuit are either connected in incorrect or reverse polarity to the run-down vehicle battery or in the event the run-down vehicle battery has an internal short circuit, (b) means for readily selecting the correct charging circuit for a six volt or a twelve volt run-down vehicle battery, and (c) means normally connecting the service truck battery and the auxiliary battery in parallel charge from the service truck generator providing a preferential charge rate to the service truck or auxiliary battery according to their relative recharge requirements.

Other objects of the invention will become apparent by reference to the accompanying drawing, in which:

The single FIGURE is a diagrammatic view showing a preferred apparatus and circuit embodying the invention, a Key to Symbols being provided in connection therewith.

Rather than employing a series of reference numerals in the following description, the several elements of the invention hereinafter will be referred to for clarity by nomenclature employed in the figure and in the Key to Symbols.

Referring now to the drawings wherein like reference characters and nomenclature refer to like and corresponding elements throughout the single figure, the invention is illustrated assuming that the service truck, which carries means for providing booster current to a motor vehicle having a run-down battery, includes in its engine electrical system a 12-volt service truck battery, a generator, a voltage regulator, and other conventional items which need not be mentioned or described herein. The service truck also carries an auxiliary 12-volt battery and a control unit including a control circuit, a battery charge circuit and a power circuit, and such switches, relays and connectors electrically connected into an improved and readily operable means adapted to apply booster current selectively to either a 6-volt or a 12-volt run-down battery of another motor vehicle.

The control unit is housed in a suitable compact control box (not shown) and has leads thereto from the armature terminal of the service truck generator and from the service truck voltage regulator.

The said control unit includes therein a double pole double throw main switch SW–1 connected to the armature terminal of the service truck generator and to the battery terminal of the service truck voltage regulator, the said main switch SW–1 being movable to On and Off positions.

The said control unit further includes a single pole double throw selector switch SW–2 connected to the battery terminal of the service truck voltage regulator through the main switch SW–1 when the said main switch SW–1 is in its On position. The said selector switch SW–2 having a 6-volt run-down battery boost position and a 12-volt run-down battery boost position to apply selectively proper booster current to the run-down battery of vehicles employing either a 6-volt or 12-volt electrical system.

The power circuit illustrated by heavy full lines in the drawing connects the service truck 12-volt battery and the auxiliary 12-volt battery carried by the service truck to a run-down battery when said main switch SW–1 is in its On position and when said selector switch SW–2 is in either its 6-volt or 12-volt run-down battery position.

Flexible cable leads FC from the said power circuit are connectible selectively by such means as alligator clamps C in mating polarity to either a 6-volt run-down battery or a 12-volt run-down battery of a motor vehicle other than the service truck.

As illustrated in the drawing, the power circuit has therein a plurality of normally open solenoid operated relays R–1, R–2, R–3 and R–4 which are closable responsive to the energization of the solenoids thereof by current supplied thereto by the control circuit through the main switch SW–1 and the selector switch SW–2; the said control circuit selectively closing relays R–1, R–2, R–3 and R–4 according to the positions to which the main switch SW–1 and the selector switch SW–2 are thrown.

Further, as illustrated in the drawings, various elements of the power circuit and control circuit are grounded as required to a ground common to the service truck ground.

With the main switch SW–1 in its Off position, the flexible leads FC are connected in parallel polarity to either the 6-volt run-down battery or the 12-volt run-down battery of a motor vehicle to provide booster current thereto. If the said flexible leads FC are accidentally connected in reverse polarity, the reversed polarity warning light will illuminate, and the error must be corrected. If and when the reversed polarity warning light does not signal reversed polarity, the leads FC are correctly connected to the run-down-battery of the motor vehicle.

If the motor vehicle battery to which the flexible leads FC are connected is a 6-volt run-down battery, then the selector switch SW-2 is thrown to its 6-volt run-down battery boost position, and the main switch SW-1 is thrown to its On position. This energizes the solenoid of relay R-1 and closes the same whereby 12-volt booster current is supplied through the power circuit and flexible leads FC in parallel from the service truck 12-volt battery to the 6-volt run-down battery of the motor vehicle.

Alternatively, if the motor vehicle battery to which the flexible leads FC are connected is a 12-volt run-down battery, then the selector switch SW-2 is thrown to its 12-volt run-down battery boost position, and the main switch SW-1 is thrown to its On position. This energizes the solenoids of relays R-2 and R-3 and closes the same whereby 24-volt booster current is supplied through the power circuit and flexible leads FC from series connected service truck 12-volt battery and the auxiliary 12-volt battery to the 12-volt run-down battery of the motor vehicle.

With the main switch SW-1 in its Off position, the solenoid of the relay R-4 is energized and closes the relay R-4. This grounds the negative side of the auxiliary 12-volt battery causing the service truck 12-volt battery and the auxiliary 12-volt battery to be charged through the service truck battery charge conductors A and the auxiliary battery charge conductor B of the battery charge circuit.

By making the auxiliary battery charge conductor B substantially of the same resistance as the service truck battery charge conductor A, the service truck 12-volt battery and the auxiliary 12-volt battery will charge respectively from the service truck generator and the service truck voltage regulator according to their recharge requirements. Because of the peak high current flow requirements of the power circuit conductors during the boosting of a run-down battery, the power circuit conductors are of a current carrying capacity preferably three to six times that of the charge circuit conductors. Inasmuch as the service truck charge circuit conductor A is an integral part of the service truck electrical system, the current carrying capacity of the auxiliary battery charge circuit conductor B is determined thereby, and is of substantially the same resistance as that of the said service truck battery charge conductor A.

It is obvious that the combined battery voltages of the service truck battery and the auxiliary battery may be selected so that other than a 12-volt booster current for a 6-volt run-down battery and other than a 24-volt booster current for a 12-volt run-down battery may be employed. This may be accomplished by using auxiliary batteries of different voltages or by incorporating a suitable conventional voltage control device in the booster current circuit of the invention. Inasmuch as the foregoing modification of the means for providing booster current to a motor vehicle having a run-down battery is conventional in nature, it need not be described in detail.

Although but a single embodiment of the invention has been disclosed and described in detail, it is obvious that many changes may be made in the size, shape, detail and arrangement of the various elements of the invention, all without departing from the spirit and scope of the invention as defined by the appended claims.

I claim:

1. Means for providing a booster current to a motor vehicle having a run-down battery consisting of a service truck including in its engine electrical system a generator, a voltage regulator and a service truck 12-volt battery, an auxiliary 12-volt battery carried by said service truck, and a control unit comprising a control circuit, a battery charge circuit, and a power circuit adapted to apply booster current selectively to either a 6-volt or a 12-volt run-down battery, said control unit including a double pole double throw main switch SW-1 connected to the armature terminal of the generator and to the battery terminal of the voltage regulator and selectively movable to On and Off positions, a single pole double throw selector switch SW-2 connected to the battery terminal of the voltage regulator when said main switch SW-1 is in its On position, said SW-2 switch having a 6-volt run-down battery boost position and a 12-volt run-down battery boost position, said power circuit connecting said service truck 12-volt battery and said auxiliary 12-volt battery to a run-down battery when said main switch SW-1 is in its On position and when said selector switch SW-2 is in either its 6-volt or 12-volt run-down battery position, flexible cable leads FC from said power circuit connectible selectively in mating polarity to a 6-volt run-down battery or a 12-volt run-down battery of the motor vehicle, a plurality of normally open solenoid operated relays R-1, R-2, R-3 and R-4 in said power circuit closable responsive to energization of their solenoids through said control circuit, said control circuit selectively closing relays R-1, R-2, R-3 and R-4 according to the position to which switches SW-1 and SW-2 are thrown, the solenoid of relay R-1 being energized when SW-1 is On and SW-2 is in its 6-volt battery boost position supplying current through the power circuit and the flexible cable leads FC to a 6-volt run-down battery of a motor vehicle to which said flexible cable leads FC may be connected, the solenoid of each of relays R-2 and R-3 being energized when SW-1 is On and SW-2 is in its 12-volt battery boost position closing said relays R-2 and R-3 connecting said service truck 12-volt battery and said auxiliary 12-volt battery in series to supply current through the power circuit and flexible cable leads FC to a 12-volt run-down battery of a motor vehicle to which said flexible cable leads FC may be connected, the service truck electrical system including service truck battery charge conductor A from said service truck voltage regulator to said 12-volt service truck battery, a battery charge conductor B from said service truck voltage regulator to said auxiliary 12-volt battery through said main switch SW-1, the said main switch SW-1 in its Off position connecting the battery terminal of the service truck voltage regulator to the positive side of the auxiliary 12-volt battery through the battery charge conductor B, the solenoid of relay R-4 being energized when SW-1 is in its Off position closing said relay R-4 and grounding the negative side of the auxiliary 12-volt battery causing said service truck 12-volt battery and said auxiliary 12-volt battery to be charged by said service truck generator through said battery charge conductors A and B.

2. Means for providing a booster current to a motor vehicle having a run-down battery as claimed in claim 1 including a polarity indicator warning light connected in series through the power circuit to the positive terminal of said auxiliary 12-volt battery and through the battery charge conductor B to the positive terminal of the run-down battery of the motor vehicle, which warning light illuminates when the main switch SW-1 is in its Off position and if the positive and negative flexible cable leads FC are connected in reverse polarity to the terminals of the run-down battery to be charged.

3. Means for providing a booster current to a motor vehcile having a run-down battery as claimed in claim 1 wherein
   the conductors of the power circuit have a current carrying capacity of from three to six times that of the battery charge conductors A and B, and the battery charge conductors A and B have a substantially equal current carrying capacity.

4. Means for providing a booster current to a motor vehicle having a run-down battery as claimed in claim 1 wherein
   the combined battery voltages of the service truck battery and the auxiliary battery are selected according to booster current requirements within the capacity of the run-down battery and the capacity electrical system of the motor vehicle to accept the booster load.

References Cited in the file of this patent
UNITED STATES PATENTS 2,926,266    Porter _____ Feb. 23, 1960
2,999,969    Fritzinger _____ Sept. 12, 1961